(12) United States Patent
Roberson (10) Patent No.: US 10,323,509 B2
(45) Date of Patent: Jun. 18, 2019

(54) REPEATER FOR A WELLBORE (71) Applicant: HALLIBURTON ENERGY SERVICES, INC., Houston, TX (US)

(72) Inventor: Mark W. Roberson, Cary, NC (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/544,814

(22) PCT Filed: Mar. 20, 2015

(86) PCT No.: PCT/US2015/021805
§ 371 (c)(1),
(2) Date: Jul. 19, 2017

(87) PCT Pub. No.: WO2016/153466
PCT Pub. Date: Sep. 29, 2016

(65) Prior Publication Data
US 2018/0010446 A1 Jan. 11, 2018

(51) Int. Cl.
E21B 47/12 (2012.01)
E21B 33/14 (2006.01)
H04B 7/155 (2006.01)
E21B 47/00 (2012.01)
E21B 47/14 (2006.01)
E21B 49/00 (2006.01)
E21B 49/08 (2006.01)

(52) U.S. Cl.
CPC ............ *E21B 47/122* (2013.01); *E21B 33/14* (2013.01); *E21B 47/124* (2013.01); *H04B 7/155* (2013.01); *E21B 47/00* (2013.01); *E21B 47/14* (2013.01); *E21B 49/00* (2013.01); *E21B 49/08* (2013.01)

(58) Field of Classification Search
CPC .............................................. E21B 47/12–187
See application file for complete search history.

(56) References Cited

U.S. PATENT DOCUMENTS 6,816,082 B1 * 11/2004 Laborde ................. E21B 47/12
340/853.2
7,712,527 B2 5/2010 Roddy
(Continued)

FOREIGN PATENT DOCUMENTS

EP 2157279 A1 2/2010

OTHER PUBLICATIONS

Chief Counsel Report "Well Cementing", National Commission on the BP Deepwater Horizon Oil Spill and Offshore Drilling; Chapter 4.3 Cement; Apr. 2010.
(Continued)

*Primary Examiner* — Laura N Nguyen
(74) *Attorney, Agent, or Firm* — Polsinelli PC (57) ABSTRACT A repeater system provided in a wellbore including a plurality of communication units spaced at intervals along a length of a wellbore, the communication units being communicatively coupled via a transmission medium. The communication units are configured to relay data from one communication unit to another communication unit selected from the plurality of communication units along the transmission medium, wherein at least one of the communication units is hopped over as data is relayed across the plurality of communication units along the length of the wellbore.

19 Claims, 8 Drawing Sheets (56) References Cited

U.S. PATENT DOCUMENTS

| | | | |
|---|---|---|---|
| 8,162,050 B2 | 4/2012 | Roddy et al. | |
| 8,162,055 B2 | 4/2012 | Lewis et al. | |
| 8,291,975 B2 | 10/2012 | Roddy et al. | |
| 8,297,352 B2 | 10/2012 | Roddy et al. | |
| 8,297,353 B2 | 10/2012 | Roddy et al. | |
| 8,302,686 B2 | 11/2012 | Roddy et al. | |
| 8,316,936 B2 | 11/2012 | Roddy et al. | |
| 8,342,242 B2 | 1/2013 | Roddy et al. | |
| 2005/0098323 A1* | 5/2005 | Cook | E21B 7/208 166/384 |
| 2008/0253228 A1* | 10/2008 | Camwell | E21B 47/12 367/82 |
| 2009/0190484 A1* | 7/2009 | Johnson | E21B 47/12 370/252 |
| 2011/0199228 A1* | 8/2011 | Roddy | E21B 33/13 340/856.4 |
| 2011/0192597 A1 | 10/2011 | Roddy et al. | |
| 2012/0286987 A1 | 11/2012 | Kawaguchi et al. | |
| 2014/0174732 A1 | 6/2014 | Goodwin et al. | |
| 2014/0266769 A1* | 9/2014 | van Zelm | E21B 47/12 340/854.3 |

OTHER PUBLICATIONS

Cementing Basics; retrieved from the internet: http://gekengineering.com/Downloads/Free_Downloads/Cementing.pdf; downloaded Mar. 20, 2015.
Cementing Operations; http://petrowiki.org/cementing_operations?_ga=1.90869342.552524777.1420; Jan. 2, 2015.
International Search Report and Written Opinion; PCT Application No. PCT/US2015/021805; dated Nov. 16, 2015.

* cited by examiner

REPEATER FOR A WELLBORE

CROSS-REFERENCE TO RELATED APPLICATIONS

This application is a national stage entry of PCT/US2015/021805 filed Mar. 20, 2015, said application is expressly incorporated herein in its entirety.

FIELD

The present disclosure relates generally to subterranean wellbore systems for hydrocarbon recovery. More particularly, the present application relates to systems and methods for the transmission of data throughout a wellbore.

BACKGROUND

Oil and gas operations involve accessing underground hydrocarbon reservoirs contained within subterranean formations. In order to access hydrocarbon reserves a wellbore is drilled from the earth's surface or ocean floor to reach hydrocarbon containing formations. Once a wellbore is drilled, often times a steel casing is inserted into the well bore and cemented in place. Further operations can take place to fracture the formation, pump proppants or other fluids within the wellbore and withdraw hydrocarbons.

During various operations it may be necessary to determine characteristics of the formation, casing, cement, fluid or other components within the wellbore. Sensor or detecting units can be placed downhole within the wellbore, for example via wireline, with casing or tubing or other manner to assist in obtaining or generating information about components within the wellbore. Additionally, information may be transmitted between the components and to the surface.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Definitions

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side or bottom of the page is downhole compared to the left-hand side, further the top of the page is toward the surface, and the lower side of the page is downhole. Further the terms "proximal" here refer directionally to portions further toward the surface in relation to "distal" which refers directionally downhole and away from the surface in a downhole environment. A "processor" as used herein is an electronic circuit that can make determinations based upon inputs. A processor can include a microprocessor, a microcontroller, and a central processing unit, among others. While a single processor can be used, the present disclosure can be implemented over a plurality of processors.

Several definitions that apply throughout this disclosure will now be presented. The term "coupled" is defined as connected, whether directly or indirectly through intervening components, and is not necessarily limited to physical connections. The term "communicatively coupled" is defined as connected, either directly or indirectly through intervening components, and the connections are not necessarily limited to physical connections, but are connections that accommodate the transfer of data between the so-described components. The connection can be such that the objects are permanently connected or releasably connected. The term "outside" refers to a region that is beyond the outermost confines of a physical object. The terms "comprising," "including" and "having" are used interchangeably in this disclosure. The terms "comprising," "including" and "having" mean to include, but not necessarily be limited to the things so described.

Disclosed herein is a system and method for transmitting data throughout a wellbore, and ultimately to the surface for processing. For example, during oil and gas operations it becomes necessary to determine the condition of various downhole components such as a wellbore, formation, casing, or compositions within the wellbore such as drilling fluids, sealants such as cements, hydrocarbons or other fluids within the wellbore. Accordingly sensors are placed down within the wellbore to sense various characteristics. Sensors can be placed along the length of the casing, or provided within a fluid and pumped downhole. The sensors gather various data regarding the downhole components. However once gathered, the data must be transmitted to a processor unit within the wellbore or to the surface. The sensors, or the position where a data source is originated, can be deep within a wellbore, and thus transmission in efficient and effective ways to outside the wellbore is desirable. Accordingly, disclosed herein is a relay or "repeater" system for transmitting the detected data to a final destination for review or processing.

In some examples, a plurality of communication units can be provided along the length of the wellbore or casing in the wellbore in intervals. The communication units can be communicatively coupled by wireline or via the casing itself. One or more of the communication units can first receive data from one of the aforementioned sensors, and transmit the data processed or unprocessed further uphole. In some cases this can be carried out via "bucket brigade," where a data packet is received, temporarily stored and re-transmitted to an adjacent communication unit further uphole.

Although bucket brigade can be used, this system can be modified to employ a "hop" system. This is where a communication unit skips, i.e. hops over, the immediately adjacent communication unit, or multiple adjacent units, to the next adjacent unit. In such case, one or more communication units is hopped over as data is relayed across the plurality of communication units along the length of the wellbore. The number of nodes, pattern of nodes or particular nodes to be hopped can be static. Alternatively, the nodes to be hopped can be dynamically assigned. For example, if a node is determined to be inactive, the node can be hopped. Other patterns and nodes can be hopped as disclosed herein. The system and method for transmitting data throughout a wellbore is discussed in more detail in the following.

Data Sensors Provided in Exemplary Sealant

Data sensors can be employed to detect and/or monitor the position and/or condition of a wellbore, a formation, a wellbore service tool, and/or wellbore compositions, for example wellbore sealants such as cement or other fluids. While not to be limited hereto, one example of a data sensor which can be employed in the communication system include a plurality of Micro-Electro-Mechanical System (MEMS) data sensors. The MEMS sensors can be provided in a wellbore composition and provided downhole. The MEMS sensors can provide information regarding a characteristic of the wellbore composition, or a position of the fluid within the formation or the wellbore, cracks or fissures in the formation, casing, position of the composition within the casing, the top of the composition, or in the annulus between the casing and wellbore.

Figure 1:
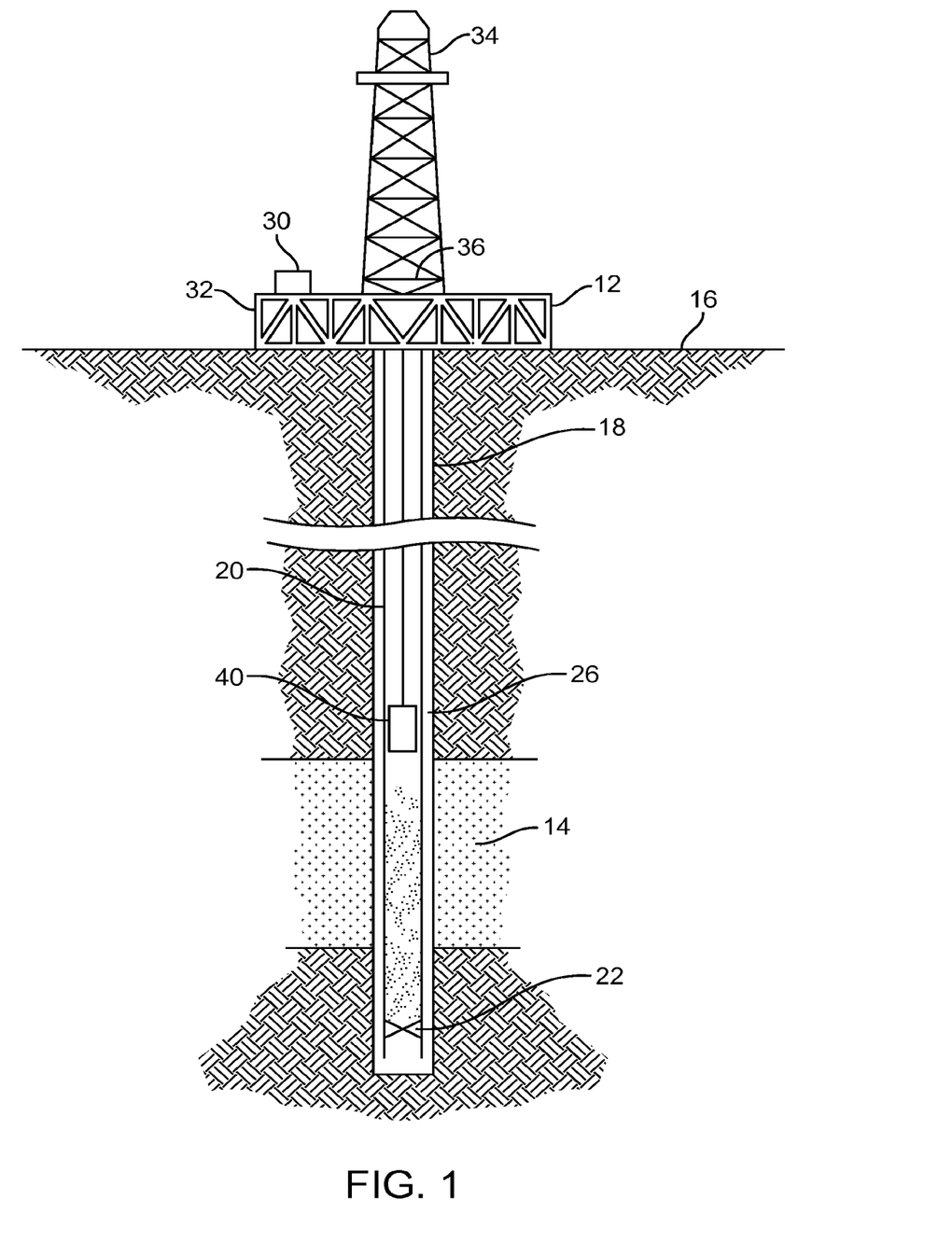
FIG. 1 is a schematic of a typical onshore oil or gas drilling rig and wellbore in accordance with some embodiments.

FIG. 1 illustrates one environment in which one can employ the data transmission system and method disclosed herein. FIG. 1 shows a typical onshore oil or gas drilling rig and wellbore, will be used to clarify the methods of the present disclosure, with the understanding that the present disclosure is likewise applicable to offshore rigs and wellbores. Rig 12 is centered over a subterranean oil or gas formation 14 located below the earth's surface 16. Rig 12 includes a work deck 32 that supports a derrick 34. Derrick 34 supports a hoisting apparatus 36 for raising and lowering pipe strings such as casing 20. Pump 30 is capable of pumping a variety of wellbore compositions (e.g., drilling fluid or cement) into the well and includes a pressure measurement device that provides a pressure reading at the pump discharge. Wellbore 18 has been drilled through the various earth strata, including formation 14. Upon completion of wellbore drilling, casing 20 is often placed in the wellbore 18 to facilitate the production of oil and gas from the formation 14. Casing 20 is a string of pipes that extends down wellbore 18, through which oil and gas will eventually be extracted. A cement or casing shoe 22 is typically attached to the end of the casing string when the casing string is run into the wellbore. Casing shoe 22 guides casing 20 toward the center of the hole and minimizes problems associated with hitting rock ledges or washouts in wellbore 18 as the casing string is lowered into the well. Casing shoe, 22, may be a guide shoe or a float shoe, and typically includes a tapered, often bullet-nosed piece of equipment found on the bottom of casing 20. Casing shoe, 22, may be a float shoe fitted with an open bottom and a valve that serves to prevent reverse flow, or U-tubing, of cement slurry from annulus 26 into casing 20 as casing 20 is run into wellbore 18. The region between casing 20 and the wall of wellbore 18 is known as the casing annulus 26. To fill up casing annulus 26 and secure casing 20 in place, casing 20 is usually "cemented" in wellbore 18, which is referred to as "primary cementing." A data interrogator tool 40 is shown in the wellbore 18.

In this example, data sensors can be provided during a primary cemented operation for fixing the casing 20 in the wellbore 18. For example, MEMS sensors are mixed into a cement slurry, and the cement slurry is then pumped down the inside of casing 20 of FIG. 1. As the slurry reaches the bottom of casing 20, it flows out of casing 20 and into casing annulus 26 between casing 20 and the wall of wellbore 18. As cement slurry flows up annulus 26, it displaces any fluid in the wellbore.

To ensure no cement remains inside casing 20, devices called "wipers" may be pumped by a wellbore servicing fluid (e.g., drilling mud) through casing 20 behind the cement. As described in more detail herein, the wellbore servicing fluids such as the cement slurry and/or wiper conveyance fluid (e.g., drilling mud) may contain MEMS sensors which aid in detection and/or positioning of the wellbore servicing fluid and/or a mechanical component such as a wiper plug, casing shoe, etc. The wiper contacts the inside surface of casing 20 and pushes any remaining cement out of casing 20. When cement slurry reaches the earth's surface 16, and annulus 26 is filled with slurry, pumping is terminated and the cement is allowed to set. The MEMS sensors of the present disclosure may also be used to determine one or more parameters during placement and/or curing of the cement slurry. Also, the MEMS sensors of the present disclosure may also be used to determine completion of the primary cementing operation, as further discussed herein below.

Figure 2:
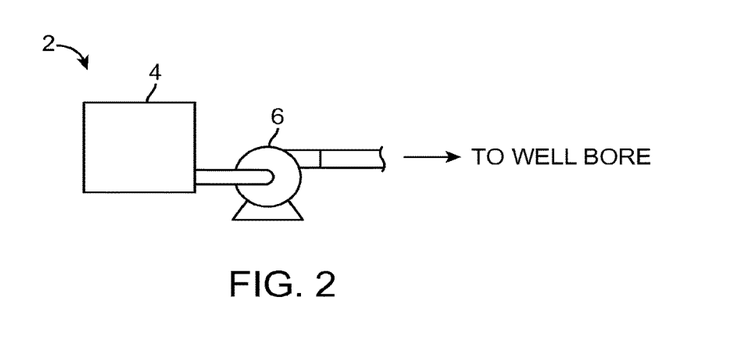
FIG. 2 illustrates a system for preparation and delivery of a cement composition to a well bore in accordance with aspects of the present disclosure.
Figure 3A:
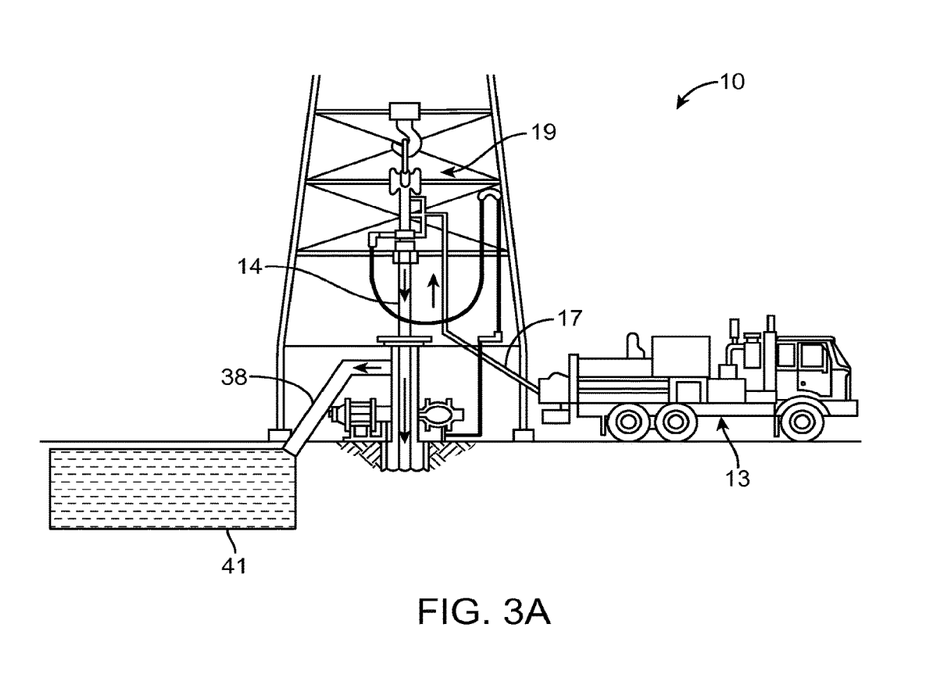
FIG. 3A illustrates surface equipment that may be used in placement of a cement composition in a well bore in accordance with aspects of the present disclosure.
Figure 3B:
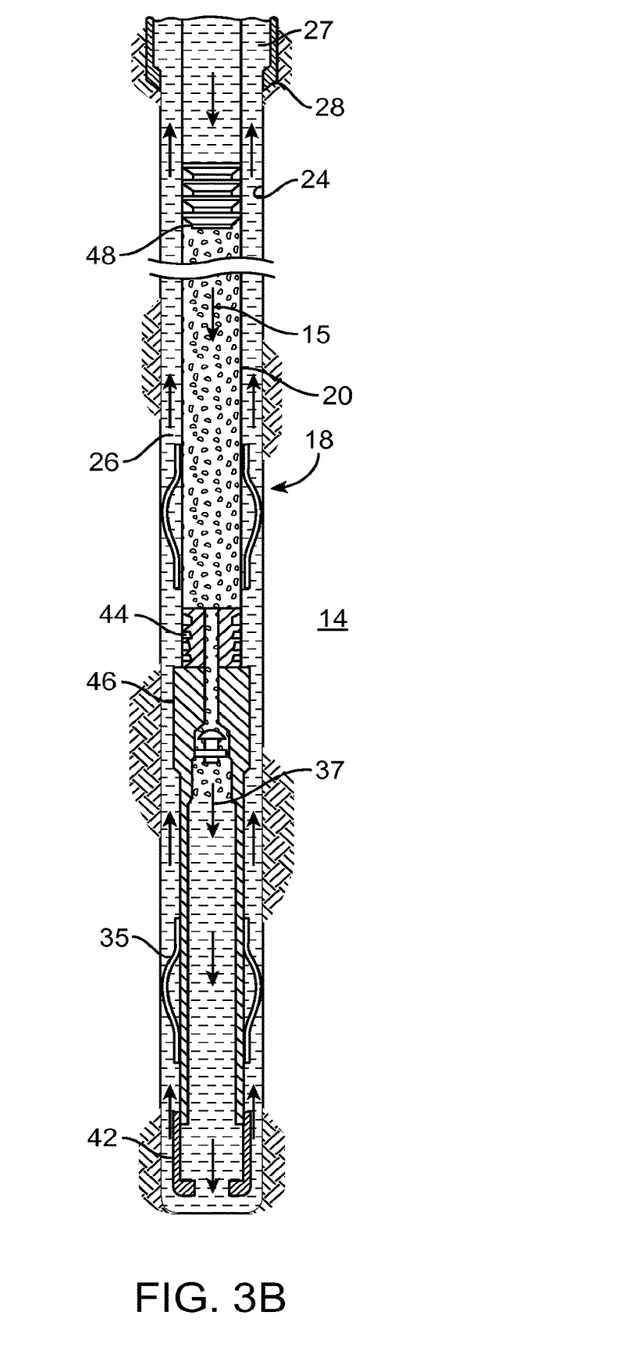
FIG. 3B illustrates placement of a cement composition into a well bore annulus in accordance with aspects of the present disclosure.

The cementing process is discussed in more detail in FIGS. 2-3B. FIG. 2 illustrates a system 2 for preparation of a cement composition and delivery to a well bore in accordance with certain embodiments. As shown, the cement composition may be mixed in mixing equipment 4, such as a jet mixer, re-circulating mixer, or a batch mixer, for example, with MEMS data sensors and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore.

An example technique and system for placing a cement composition into a subterranean formation will now be described with reference to FIGS. 3A and 3B. FIG. 3A illustrates surface equipment 10 that may be used in placement of a cement composition in accordance with certain embodiments. It should be noted that while FIG. 3A generally depicts a land-based operation, those skilled in the art will readily recognize that the principles described herein are equally applicable to subsea operations that employ floating or sea-based platforms and rigs, without departing from the scope of the disclosure. As illustrated by FIG. 3A, the surface equipment 10 may include a cementing unit 13, which may include one or more cement trucks. The cementing unit 13 may include mixing equipment 4 and pumping equipment 6 (e.g., FIG. 2) as will be apparent to those of ordinary skill in the art. The cementing unit 13 may pump a cement composition 15 through a feed pipe 17 and to a cementing head 19 which conveys the cement composition 15 downhole.

Turning now to FIG. 3B, the cement composition 15 may be placed into a subterranean formation 14 in accordance with example embodiments. As illustrated, a wellbore 18 may be drilled into the subterranean formation 14. While wellbore 18 is shown extending generally vertically into the subterranean formation 14, the principles described herein are also applicable to wellbores that extend at an angle through the subterranean formation 14, such as horizontal and slanted well bores. As illustrated, the wellbore 18 comprises walls 24. In the illustrated embodiments, a surface casing 27 has been inserted into the wellbore 18. The surface casing 27 may be cemented to the walls 24 of the wellbore 18 by cement sheath 28. In the illustrated embodiment, one or more additional conduits (e.g., intermediate casing, production casing, liners, etc.) shown here as casing 20 may also be disposed in the wellbore 18. As illustrated, there is a well bore annulus 26 formed between the casing 20 and the walls 24 of the wellbore 18 and/or the surface casing 27. One or more centralizers 35 may be attached to the casing 20, for example, to centralize the casing 20 in the wellbore 18 prior to and during the cementing operation.

With continued reference to FIG. 3B, the cement composition 15 may be pumped down the interior of the casing 20. The cement composition 15 may be allowed to flow down the interior of the casing 20 through the casing shoe 42 at the bottom of the casing 20 and up around the casing 20 into the wellbore annulus 26. The cement composition 15 may be allowed to set in the wellbore annulus 26, for example, to form a cement sheath that supports and positions the casing 20 in the wellbore 18. While not illustrated, other techniques may also be utilized for introduction of the cement composition 15. By way of example, reverse circulation techniques may be used that include introducing the cement composition 15 into the subterranean formation 14 by way of the well bore annulus 26 instead of through the casing 20.

As it is introduced, the cement composition 15 may displace other fluids 37, such as drilling fluids and/or spacer fluids, that may be present in the interior of the casing 20 and/or the wellbore annulus 26. At least a portion of the displaced fluids 37 may exit the well bore annulus 26 via a flow line 38 and be deposited, for example, in one or more retention pits 41 (e.g., a mud pit), as shown on FIG. 3A. Referring again to FIG. 3B, a bottom plug 44 may be introduced into the wellbore 18 ahead of the cement composition 15, for example, to separate the cement composition 15 from the fluids 37 that may be inside the casing 20 prior to cementing. After the bottom plug 44 reaches the landing collar 46, a diaphragm or other suitable device ruptures to allow the cement composition 15 through the bottom plug 44. In FIG. 3B, the bottom plug 44 is shown on the landing collar 46. In the illustrated embodiment, a top plug 48 may be introduced into the wellbore 18 behind the cement composition 15. The top plug 48 may separate the cement composition 15 from a displacement fluid and also push the cement composition 15 through the bottom plug 44.

Micro-Electro-Mechanical System (MEMS) Data Sensors

MEMS data sensors are well known, e.g., a semiconductor device with mechanical features on the micrometer scale. MEMS embody the integration of mechanical elements, sensors, actuators, and electronics on a common substrate. In examples, the substrate includes silicon, quartz, or fused silica. MEMS elements include mechanical elements which are movable by an input energy (electrical energy or other type of energy). Using MEMS, a sensor may be designed to emit a detectable signal based on a number of physical phenomena, including thermal, biological, optical, chemical, and magnetic effects or stimulation. MEMS devices are minute in size, have low power requirements, are relatively inexpensive and are rugged, and thus are well suited for use in wellbore servicing operations. The MEMS data sensors may also include a resonant circuit designed to create a characteristic response in a sensing device for tag detection.

The MEMS data sensors may provide information as to a location, flow path/profile, volume, density, temperature, pressure, or a combination thereof of a sealant composition, a drilling fluid, a fracturing fluid, a gravel pack fluid, or other wellbore servicing fluid in real time such that the effectiveness of such service may be monitored and/or adjusted during performance of the service to improve the result of same. The MEMS sensors can transmit data regarding a characteristic or position of the fluid to a communication unit attached to the wellbore or casing.

In addition to or in lieu of using MEMS sensors to determine a characteristic or shape of the wellbore and/or surrounding formation, the MEMS sensors may provide information regarding the flow fluid (e.g., flow dynamics and characteristics) in the wellbore and/or surrounding formation. A plurality of MEMS sensors may be placed in a wellbore composition, such as cement, the wellbore composition flowed (e.g., pumped) into the wellbore and/or surrounding formation (e.g., circulated in the wellbore), and one or more fluid flow properties, characteristics, and/or dynamics of the wellbore composition may be determined by data obtained from the MEMS sensors moving/flowing in the wellbore and/or formation. The data may be obtained from the MEMS sensors according to any of the examples disclosed herein (e.g., one or more mobile data interrogators tripped into and out of the wellbore and/or fixed data interrogators positioned within the wellbore), and may be further communicated/transmitted to/from or within the wellbore via any of the examples disclosed herein).

For example, areas of laminar and/or turbulent flow in the wellbore composition may be determined within the wellbore and/or surrounding formation, and such information may be used to further characterize the wellbore and/or surrounding formation. The velocity and flow rate of the wellbore composition may further be obtained as described herein. In an embodiment, data from the MEMS sensors is used to perform one or more fluid flow dynamics calculations for the flow of the wellbore composition through the wellbore and/or the surrounding formation. For example, data from the MEMS sensors may be used as input to a computational fluid dynamics equation or software. Such information may be used in designing down hole tools, for example designing a down hole tool/device in a manner to reduce drag and/or turbulence associated with the tool/device as the wellbore composition flows through and/or past the tool. When included in a sealant such as cement, the MEMS sensors can be used to detect the position, flow and top of the cement during and after placement.

MEMS can be passive sensors that do not require continuous power from a battery or an external source in order to transmit real-time data. These can include passive RF structures, for example including LC resonator elements as part of the MEMS devices. MEMS data sensors can also be active sensors, for example powered by an internal battery that is rechargeable or otherwise powered and/or recharged by other downhole power sources such as heat capture/transfer and/or fluid flow, as described in more detail herein. Whether MEMS is passive or active may depend on the particular application, for example, sealants such as cement the MEMS may be passive, whereas for a wellbore servicing fluid, the MEMS sensor may be active.

The MEMS sensors can include an active material connected to (e.g., mounted within or mounted on the surface of) an enclosure, the active material being liable to respond to a wellbore parameter, and the active material being operably connected to (e.g., in physical contact with, surrounding, or coating) a capacitive MEMS element. Accordingly, the MEMS sensors can sense one or more parameters within the wellbore. For example in some instances, the parameter is temperature. Alternatively, the parameter may be pH. Alternatively, the parameter is moisture content. Still alternatively, the parameter may be ion concentration (e.g., chloride, sodium, and/or potassium ions). The MEMS sensors may also sense well cement characteristic data such as stress, strain, or combinations thereof. In examples, the MEMS sensors of the present disclosure may comprise active materials that respond to two or more measurands. In such a way, two or more parameters may be monitored.

A MEMS sensor incorporated within one or more of the wellbore compositions disclosed herein may provide information that allows a condition (e.g., thickness, density, volume, settling, stratification, etc.) and/or location of the composition within the subterranean formation to be detected. When included in a sealant such as cement, the MEMS sensors can be used to detect the position, flow and top of the cement during and after placement.

The MEMS sensors are coupled with radio frequency identification devices (RFIDs) and can thus detect and transmit parameters and/or well cement characteristic data for monitoring the cement during its service life. RFIDs combine a microchip with an antenna (the RFID chip and the antenna are collectively referred to as the "transponder" or the "tag"). The antenna provides the RFID chip with power when exposed to a narrow band, high frequency electromagnetic field from a transceiver. A dipole antenna or a coil, depending on the operating frequency, connected to the RFID chip, powers the transponder when current is induced in the antenna by an RF signal from the transceiver's antenna. Such a device can return a unique identification "ID" number by modulating and re-radiating the radio frequency (RF) wave. Passive RF tags are gaining widespread use due to their low cost, indefinite life, simplicity, efficiency, ability to identify parts at a distance without contact (tether-free information transmission ability). These robust and tiny tags are attractive from an environmental standpoint as they require no battery. The MEMS sensor and RFID tag are preferably integrated into a single component (e.g., chip or substrate), or may alternatively be separate components operably coupled to each other. In an embodiment, an integrated, passive MEMS/RFID sensor contains a data sensing component, an optional memory, and an RFID antenna, whereby excitation energy is received and powers up the sensor, thereby sensing a present condition and/or accessing one or more stored sensed conditions from memory and transmitting same via the RFID antenna.

In examples, MEMS sensors having different RFID tags, i.e., antennas that respond to RF waves of different frequencies and power the RFID chip in response to exposure to RF waves of different frequencies, may be added to different wellbore compositions. Within the United States, commonly used operating bands for RFID systems center on one of the three government assigned frequencies: 125 kHz, 13.56 MHz or 2.45 GHz. A fourth frequency, 27.125 MHz, has also been assigned. When the 2.45 GHz carrier frequency is used, the range of an RFID chip can be many meters. While this is useful for remote sensing, there may be multiple transponders within the RF field. In order to prevent these devices from interacting and garbling the data, anti-collision schemes are used, as are known in the art. In examples, the data sensors are integrated with local tracking hardware to transmit their position as they flow within a wellbore composition such as a sealant slurry.

The sensors may organize themselves into a network by listening to one another, therefore allowing communication of signals from the farthest sensors towards the sensors closest to the interrogator to allow uninterrupted transmission and capture of data.

The data sensors may form a network using wireless links to neighboring data sensors and have location and positioning capability through, for example, local positioning algorithms as are known in the art.

In examples, the MEMS sensors are ultra-small, e.g., 3 $mm^2$, such that they are pumpable in a sealant slurry. In examples, the MEMS device is approximately 0.01 $mm^2$ to 1 $mm^2$, alternatively 1 $mm^2$ to 3 $mm^2$, alternatively 3 $mm^2$ to 5 $mm^2$, or alternatively 5 $mm^2$ to 10 $mm^2$. In examples, the data sensors are capable of providing data throughout the cement service life. In examples, the data sensors are capable of providing data for up to 100 years. In an example, the wellbore composition includes an amount of MEMS effective to measure one or more desired parameters. In various examples, the wellbore composition includes an effective amount of MEMS such that sensed readings may be obtained at intervals of about 1 foot, alternatively about 6 inches, or alternatively about 1 inch, along the portion of the wellbore containing the MEMS. In an example, the MEMS sensors may be present in the wellbore composition in an amount of from about 0.001 to about 10 weight percent. Alternatively, the MEMS may be present in the wellbore composition in an amount of from about 0.01 to about 5 weight percent. In examples, the sensors may have dimensions (e.g., diameters or other dimensions) that range from nanoscale, e.g., about 1 to 1000 nm (e.g., NEMS), to a micrometer range, e.g., about 1 to 1000 μm (e.g., MEMS), or alternatively any size from about 1 nm to about 1 mm. In examples, the MEMS sensors may be present in the wellbore composition in an amount of from about 5 volume percent to about 30 volume percent.

The size and/or amount of sensors present in a wellbore composition (e.g., the sensor loading or concentration) may be selected such that the resultant wellbore servicing composition is readily pumpable without damaging the sensors and/or without having the sensors undesirably settle out (e.g., screen out) in the pumping equipment (e.g., pumps, conduits, tanks, etc.) and/or upon placement in the wellbore. Also, the concentration/loading of the sensors within the wellbore servicing fluid may be selected to provide a sufficient average distance between sensors to allow for networking of the sensors (e.g., daisy-chaining) in examples using such networks, as described in more detail herein. For example, such distance may be a percentage of the average communication distance for a given sensor type. By way of example, a given sensor having a 2 inch communication range in a given wellbore composition should be loaded into the wellbore composition in an amount that the average distance between sensors in less than 2 inches (e.g., less than 1.9, 1.8, 1.7, 1.6, 1.5, 1.4, 1.3, 1.2, 1.1, 1.0, etc. inches). The size of sensors and the amount may be selected so that they are stable, do not float or sink, in the well treating fluid. The size of the sensor could range from nano size to microns. In some examples, the sensors may be nanoelectromechanical systems (NEMS), MEMS, or combinations thereof. Unless otherwise indicated herein, it should be understood that any suitable micro and/or nano sized sensors or combinations thereof may be employed. The examples disclosed herein should not otherwise be limited by the specific type of micro and/or nano sensor employed unless otherwise indicated or prescribed by the functional requirements thereof, and specifically NEMS may be used in addition to or in lieu of MEMS sensors in the various examples disclosed herein.

In examples, the MEMS sensors include passive (remain unpowered when not being interrogated) sensors energized by energy radiated from a data interrogation tool or communication units, which is further described in the following.

Wellbore Sensing System Having MEMS Data Sensors and Communication Units

Figure 4:
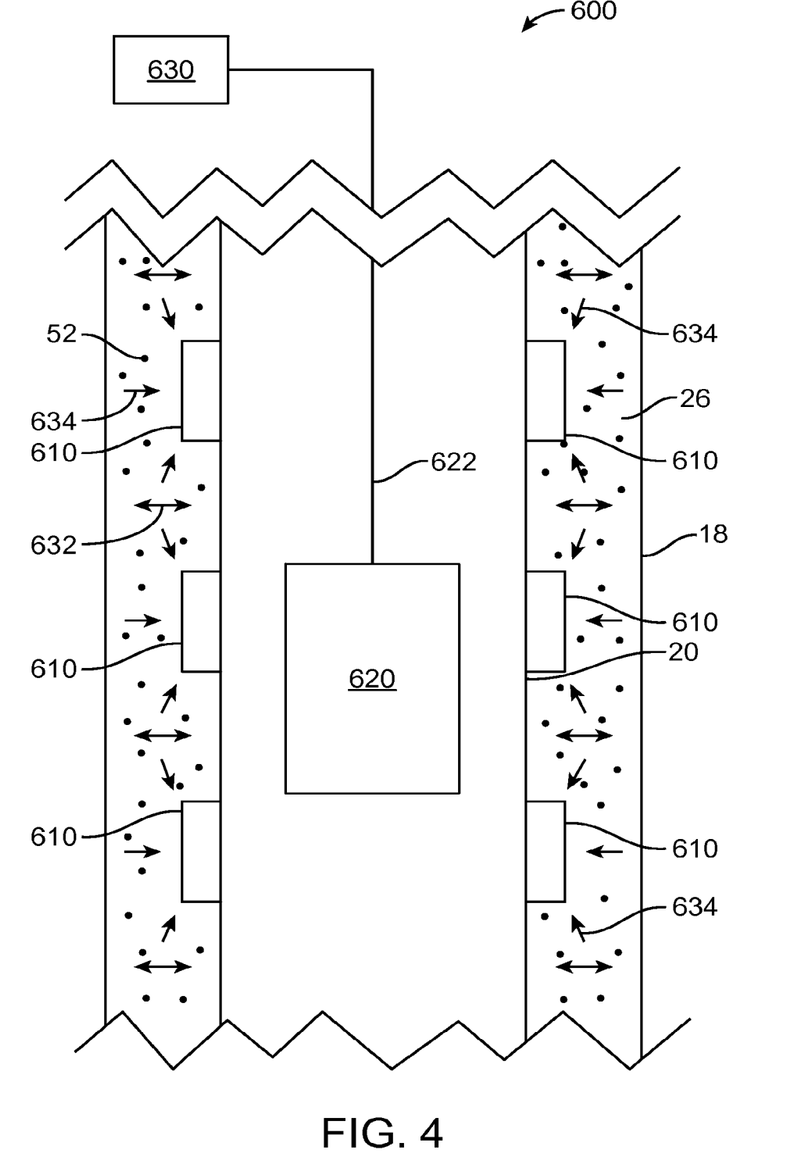
FIG. 4 is a schematic view of another embodiment of a wellbore parameter sensing system.

Referring to FIG. 4, a schematic view of an example of a wellbore parameter sensing system 600 with MEMS data sensors provided in a sealant. The wellbore parameter sensing system 600 may include the wellbore 18, inside which the casing 20 is situated. The wellbore parameter sensing system 600 may further include a plurality of communication units 610, which may be situated on the casing 20 and spaced at regular or irregular intervals along the casing, e.g., about every 5 m to 15 m along the length of the casing 20, alternatively about every 8 m to 12 m along the length of the casing 20, alternatively about every 10 m along the length of the casing 20. The communication units 610 may also be situated on or in casing collars that couple casing joints together. In addition, the communication units 610 may be situated in an interior of the casing 20, on an exterior of the casing 20, or both.

The wellbore parameter sensing system 600 may further include a tool (e.g., a data interrogator 620 or other data collection and/or power-providing device), which may be lowered down into the wellbore 18 on a wireline 622, as well as a processor 630 or other data storage or communication device, which is connected to the data interrogator 620.

In an example, each communication unit 610 may be configured to interrogate and/or receive data from, MEMS sensors 52 situated in the annulus 26, in the vicinity of the communication unit 610, whereby the vicinity of the communication unit 610 is defined as in the above discussion of the wellbore parameter sensing system 600 illustrated in FIG. 4. The MEMS sensors 52 may be configured to transmit MEMS sensor data to neighboring MEMS sensors 52, as denoted by double arrows 632, as well as to transmit MEMS sensor data to the communication units 610 in their respective vicinities, as denoted by single arrows 634. In an example, the MEMS sensors 52 may be passive sensors that are powered by bursts of electromagnetic radiation from the communication units 610. In a further example, the MEMS sensors 52 may be active sensors that are powered by batteries situated in or on the MEMS sensors 52 or by other downhole power sources.

The communication units 610 in the present example of the wellbore parameter sensing system 600 are not wired to one another. However, the communication units 610 may communicate with one another via the casing 20 can act as a transmission medium. For example, each communication unit 610 can have a transmitter or receiver for transmitting or receiving acoustic signals. The acoustic signal can be processed to an electronic signal. In various examples, the acoustic telemetry examples and associated equipment may be combined with a network formed by the MEMS sensors and/or data interrogation/communication units. Alternatively, or additionally, electronic signals can be sent via the casing.

Accordingly, in an example, the communication units 610 may be powered by batteries, which enable the communication units 610 to interrogate the MEMS sensors 52 in their respective vicinities and/or receive MEMS sensor data from the MEMS sensors 52 in their respective vicinities. The batteries of the communication units 610 may be inductively rechargeable by the data interrogator 620 or may be rechargeable by other downhole power sources. In addition, as set forth above, the data interrogator 620 may be lowered into the wellbore 18 for the purpose of interrogating communication units 610 and receiving the MEMS sensor data stored in the communication units 610. Furthermore, the data interrogator 620 may be configured to transmit the MEMS sensor data to the processor 630, which processes the MEMS sensor data. Additionally, a fluid containing MEMS can be provided within the wellbore casing, and the data interrogator 620 is conveyed through such fluid and into communicative proximity with the communication units 610. The data interrogator 620 may communicate with, power up, and/or gather data directly from the various MEMS sensors distributed within the annulus 26 and/or the casing 20, and such direct interaction with the MEMS sensors may be in addition to or in lieu of communication with one or more of the communication units 610. For example, if a given communication unit 610 experiences an operational failure, the data interrogator 620 may directly communicate with the MEMS within the given region experiencing the failure, and thereby serve as a backup (or secondary/verification) data collection option.

Figure 5:
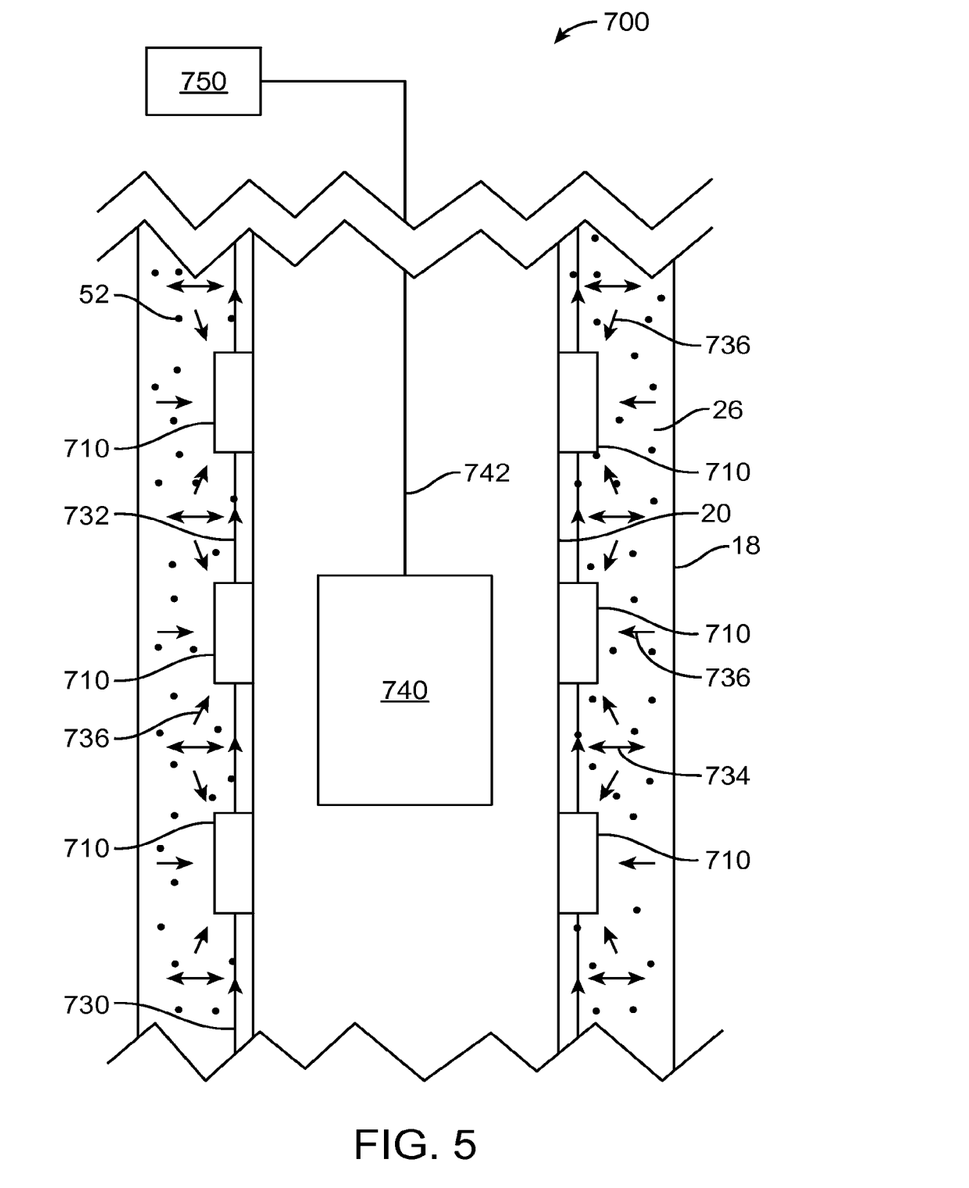
FIG. 5 is a schematic view of another embodiment of a wellbore parameter sensing system.

Referring to FIG. 5, a schematic view of an example of a wellbore parameter sensing system 700 is illustrated. As in earlier-described examples, the wellbore parameter sensing system 700 includes the wellbore 18 and the casing 20 that is situated inside the wellbore 18. In addition, as in the case of other examples illustrated in FIG. 4, the wellbore parameter sensing system 700 includes a plurality of communication units 710, which may be situated on the casing 20 and spaced at regular or irregular intervals along the casing, e.g., about every 5 m to 15 m along the length of the casing 20, alternatively about every 8 m to 12 m along the length of the casing 20, alternatively about every 10 m along the length of the casing 20. In examples, the communication units 710 may be situated on or in casing collars that couple casing joints together. In addition, the communication units 710 may be situated in an interior of the casing 20, on an exterior of the casing 20, or both, or may be otherwise located and supported as described in various examples herein.

The communication units 710 may be communicatively coupled to one another by a wireline 730, which allows sensor data obtained by the communication units 710 from MEMS sensors 52 situated in the annulus 26 to be transmitted between the communication units 710 throughout the wellbore as indicated by directional arrows 732 for example.

The MEMS sensors 52 may sense at least one wellbore parameter and transmit data regarding the at least one wellbore parameter to the communication units 710, either via neighboring MEMS sensors 52 as denoted by double arrow 734, or directly to the communication units 710 as denoted by single arrows 736. The communication units 710 may communicate wirelessly with the primary or master communication unit, which may in turn communicate wirelessly with equipment located at the surface (or via telemetry such as casing signal telemetry) and/or other communication units 710 and/or other primary or master communication units.

Communication units may further include an acoustic or radio frequency, or electrical transceivers for sending or receiving signals between communication units or receiving signals from MEMS data sensors. The communication units can include a microprocessor for processing data such as received signals and may include memory components for storing programs or code or received data or other data.

The master communication unit can gather information from the communication units and transmit (e.g., wirelessly, via wire, via telemetry such as casing signal telemetry, etc.) such information to a station unit (having e.g., processor 750) located at the surface.

In an example, the wellbore parameter sensing system 700 further includes a data interrogator 740, which may be lowered into the wellbore 18 via a wire line 742, as well as a processor 750, which is connected to the data interrogator 740. In an example, the data interrogator 740 is suspended adjacent to the primary communication unit 720, interrogates a primary communication unit, receives MEMS sensor data collected by all of the communication units 710 and transmits the MEMS sensor data to the processor 750 for processing. The data interrogator 740 may provide other functions, for example as described with reference to data interrogator 620 of FIG. 4. In various examples, the data interrogator 740 (and likewise the data interrogator 620) may communicate directly or indirectly with any one or more of the MEMS sensors (e.g., sensors 52), local data interrogation/communication units (e.g., units 610, 710), primary or master communication units, or any combination thereof.

Repeaters for Relay of Data Throughout a Wellbore

As described one or more communication units (e.g. 610, 710) can be employed to interrogate and receive data from MEMS data sensors. As disclosed herein the received data can then be transmitted, i.e. relayed, to the surface or processing station. In order to do so communication units relay received data from one to another until reaching a master station or a final communication unit. The sensed data can be received from MEMS data sensors by multiple communication units or merely one communication unit and then relayed one to another. While one or more communication units may have interrogation capabilities (of the MEMS data sensors), for the purpose of relaying data, in some cases some communication units may not have received sensed data from MEMS data sensors, or may not have interrogation capability and thus merely have relay or "repeater" capability. Accordingly, some communication units may be considered as originating data from surrounding MEMS sensors or may have merely received sensed data from one or more other communication units which may have originated data for relay throughout a wellbore. For convenience herein communication units which relay data, whether itself originating sensed data and transmitting it on, or receiving data from other units and transmitting it, may also be referred to as "nodes" or "repeaters" in a relay network. Data referred to herein can include, but is not limited to, processed or unprocessed data from MEMS data sensors or communication units, information received or generated by communication units, and can be stored or transferred as one or more packets of data, and where a data packet may be singular or include a number of other data packets.

Figure 6:
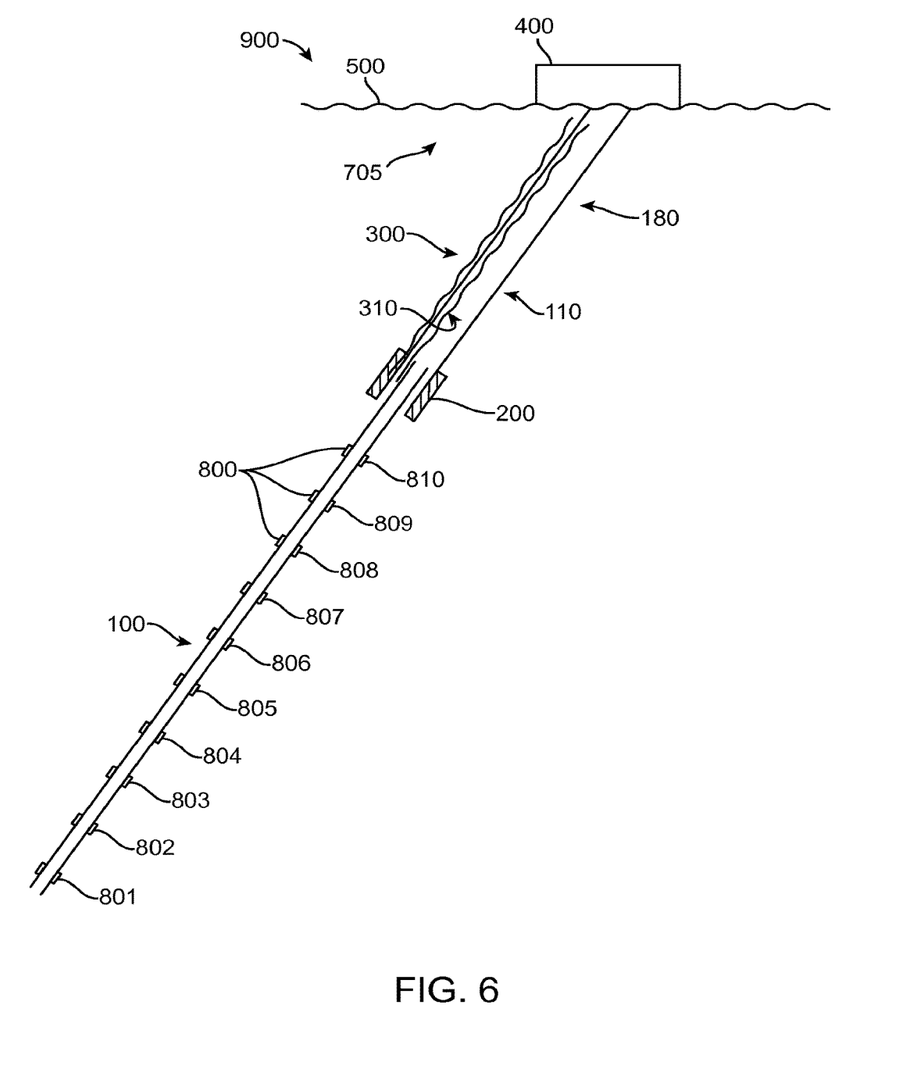
FIG. 6 is a schematic of an example repeater system disposed in a wellbore.

One example of a relay system for transmitting data throughout a wellbore is illustrated in FIG. 6. Shown therein is a relay system 900 having station 400 on the surface 500. Alternatively the station can be a rig or platform above the ocean surface. A wellbore 180 extends from the station 400 into the earth 705. An upper casing 110 can be provided from or near the surface to a distance within the wellbore 180. The upper casing 110 can be made up of a plurality of joints or segments which are joined by collars or other means. At the distal end of the upper casing 110 a master communication unit 200 can be provided. The master communication unit 200 is communicatively coupled to the station 400 via a transmission medium. The transmission medium can include external wireline 300 or internal wireline 310 with respect to casing 110, where the wirelines can include wire, cable, fiber optics, or similar means. Alternatively, the master communication unit 200 can communicate using upper casing 110, for example via casing signal telemetry.

A lower casing 100 can extend below the upper casing 110. Similar to the upper casing, the lower casing can be made up of a plurality of connected joints or segments, which are joined via collars or other means. The upper casing 110 can be of a larger diameter than the lower casing 100. Accordingly a portion of the lower casing can extend within the upper casing 110. The master communication unit 200 can be provided proximate the junction between the lower casing 100 and upper casing 110. Accordingly, the master communication unit 200 can transmit data from the top of the lower casing 100 to the station 400 via the wireline 310.

A plurality of communication units 800 can be provided along the length of the lower casing 100 spaced at regular or irregular intervals. Individual communication units are shown including 801 through 810, with 801 being the lowermost communication unit shown. Note there may be further communication units shown below 801 or above 810. Further, there may be an additional casing string extending below communication unit 801, which may be joined to lower casing 100. Each of the plurality of communication units 800 may be communicatively coupled via wireline (wire, cable, or fiber optic, or other physical conduit to transfer data) as shown in FIG. 5. While FIG. 5 shows the wireline external to the casing 20, the wireline may also be provided internal to the casing 20. Alternatively, the plurality of communication units can transfer data via the casing 20 as shown in FIG. 4.

The plurality of communication units 800 may together form a network, in that each of the units is communicatively coupled either directly or indirectly via intervening communication units. While in the exemplary embodiments above, one or more communication units interrogate MEMS data sensors thereby receiving and originating data to other communication units, in alternative examples, the communication units can have sensors for detecting various physical phenomena similar to MEMS. The data can then be relayed to master communication unit 200, which can then transmit directly to the station 400.

Any one or more of the plurality of communication units 800 may first detect data, and thereby "originate" the data to relay to other communication units. For example, the communication unit 801 may first sense data from MEMS data sensors and relay through the network of communication units. Alternatively, communication unit near the middle or near the top may first sense data and transmit it for relay up the network. Additionally, each of the communication units in the network may receive detected data from a sensor (e.g. MEMS data sensor) for relay through the network of communication units. Accordingly, one or more communication units may first receive data for relay.

As shown in FIG. 6, a relay system 900 is shown having a master communication unit 200 is shown at the junction between the lower casing 100 and upper casing 110. Alternatively, the master communication unit 200 can be just outside the entrance of the wellbore at an ocean floor, and be communicatively coupled via a wireline to a platform or rig having station 400. Ultimately, the data relayed by the plurality of communication units 800 can be transmitted to the master communication unit 200. The master communication unit can process the data received and/or transmit the data to station 400. The station 400 can process the data and permit access by operators. Accordingly, the plurality of communication units 800 can be provided to generate and/or relay sensed data from within the wellbore to the master communication unit 200 further up or just outside the wellbore, and which has a direct communication linkage to the station 400 at the surface. This way data can be efficiently generated and/or transmitted to a master communication unit, which then provides it to a final station for review or processing by operators at the surface.

Data may be transferred throughout the plurality of communication units 800 via bucket brigade. In the instance of "bucket brigade," a data packet is received, temporarily stored and re-transmitted to an adjacent communication unit further uphole. For example, communication unit 801 may receive sensed data, for example from a MEMS data sensor or other source, and transmit the data to communication unit 802. The communication unit 802 then receives, temporarily stores the same and transmits the same to communication unit 803, which then does the same and transmits to 804 and so on. This can repeat sequentially up the line until the final communication unit 810, or the "nth" unit where there are n number of communication units. Alternatively or additionally, the repeated relay can occur from communication unit 801, successively from unit 802, to 803 until communication unit 810, and then finally transmission to the master communication unit 200. The master communication unit 200 then can transmit directly to the station 400.

In addition, the plurality of communication units 800 rather than transmitting solely to the adjacent unit, may involve a single or multiple "hop" process, where one or more communication units are skipped as data is relayed through the plurality of communication units 800. For example, in such a hop process at least one of the plurality of communication units 800 is skipped as data is transferred across the plurality of communication units along the length of the wellbore to the final communication unit 810 or master communication unit 200.

The hops can be conducted according to set pattern. For example, the communication units can be set to hop over the immediately adjacent communication unit. For example, communication unit 801 would hop over communication unit 802, thereby transmitting to unit 803. Further, unit 803 upon receiving, temporarily storing the data, can then transmit data to unit 805 thereby skipping over unit 804. In this manner every other communication unit is skipped as data is relayed throughout the plurality of communication units. Therefore, the repeater system would transmit data through the communications units in the following order 801, 803, 805, 807, 809 etc. Alternatively, or simultaneously, unit 802, upon receiving data can transmit the same to unit 804, thereby skipping unit 803. Further, every other communication unit can be skipped as data is transferred throughout the plurality of communication units. Therefore, the repeater system would also transmit data through the communication units in the following order 802, 804, 806, 808, and 810 etc.

Alternatively, rather than hopping a single adjacent communication units, two units could be hopped, or alternatively three, four, five or more units. Other patterns can be employed as well for example, where one unit is hopped and then two units are hopped. Further, in some instances it can depend on the transmission strength of the communication unit, wherein it a unit may have sufficient transmission strength to hop one unit, or two units, three units, or more. The communication units can be statically programmed so as to hop one or more particular units during the relay throughout the plurality of communication units.

Alternatively, the communication units can be dynamically assigned. In such cases the one or more hops can be altered or depend upon various conditions. For example, if a communication unit, such as unit 801, is to transmit data to the adjacent communication unit 802, if unit 802 becomes inactive, unit 801 could instead transmit to unit 803 thereby hopping unit 802. For example, communication unit 801 could transmit to unit 802. However, if a receipt acknowledgement is not received from unit 802 within a specific time frame, then unit 801 would instead transmit to unit 803. Again, unit 801 would await a receipt acknowledgement from unit 803. If received then unit 801 would consider the relay complete. If no acknowledgment receipt is received from unit 803, then unit 801 would transmit to unit 804 and repeat the process. Alternatively or additionally, unit 801 could make multiple attempts (for example 2, 3, 4, or more attempts), and if no acknowledgement receipt is received then unit 801 would then attempt to transmit to the next adjacent unit. A predetermined time can be set to await acknowledgement receipt. Alternatively a random or pseudo random delay could be employed. For example, roughly similar time frames could be set for awaiting receipt.

Further, if a communication unit, such as unit 801, attempts a transmission and receives no acknowledgement, the receiving node can be considered "dead" or inactive. Unit 801 could then save or keep record of the inactive communication unit, and accordingly if unit 801 again is to transmit data, it can skip such unit. For example, if unit 802 were to fail to acknowledge, unit 801 can then on subsequent transmissions hop unit 802 without having made attempts.

Further when unit 801 deems unit 802 inactive and transmits to unit 803, unit 801 can include in a data packet that unit 802 is inactive. Accordingly, if further units in the plurality of communication units 800 become inactive, these can be noted to develop a pointer list of active and/or inactive units wherein the active units can be included for relaying data, and inactive units are hopped. This list can also be provided to the master communication unit 200 and thereafter station 400 such that an operator can determine various units which may be inactive.

Further, the dynamic assignment described herein can include a pointer list of active and inactive communication units. The list can be formed for example by the communication units when a network is formed therebetween the units. For example, each of the units in the plurality communication units 800 may send a status check transmission between each, which can include the hop system as described herein. The pointer list can include the addresses of each of the communication units making up the active units. The pointer list can be kept at each communication unit, or can be transmitted as part of a data packet and developed and changed as the data packet is transmitted throughout the plurality of communication units.

When transferring data throughout the plurality of communication units, the data can be simply that originated or received by the first communication unit. Alternatively, each communication unit can receive data from a previous communication unit, while also originating or including data sensed by itself or received from MEMS data sensors around itself, and adding this to the received data, and then transmitting to the next communication unit. In such case each communication unit both receives and contributes data for relay.

Figure 7:
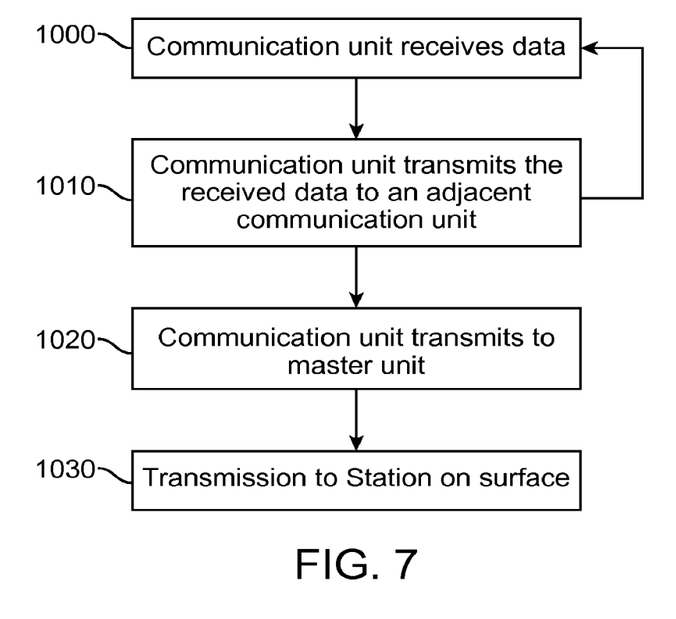
FIG. 7 is a flow diagram for relaying data in a wellbore.
Figure 8:
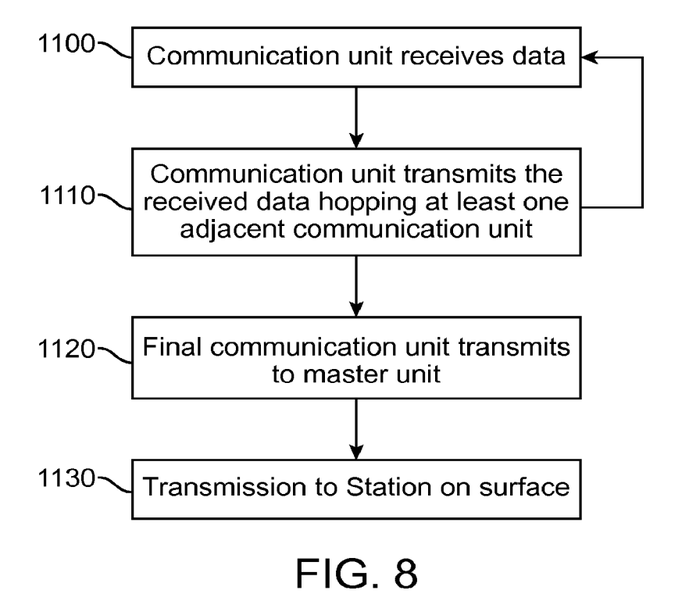
FIG. 8 is a flow diagram for relaying data in a wellbore.
Figure 9:
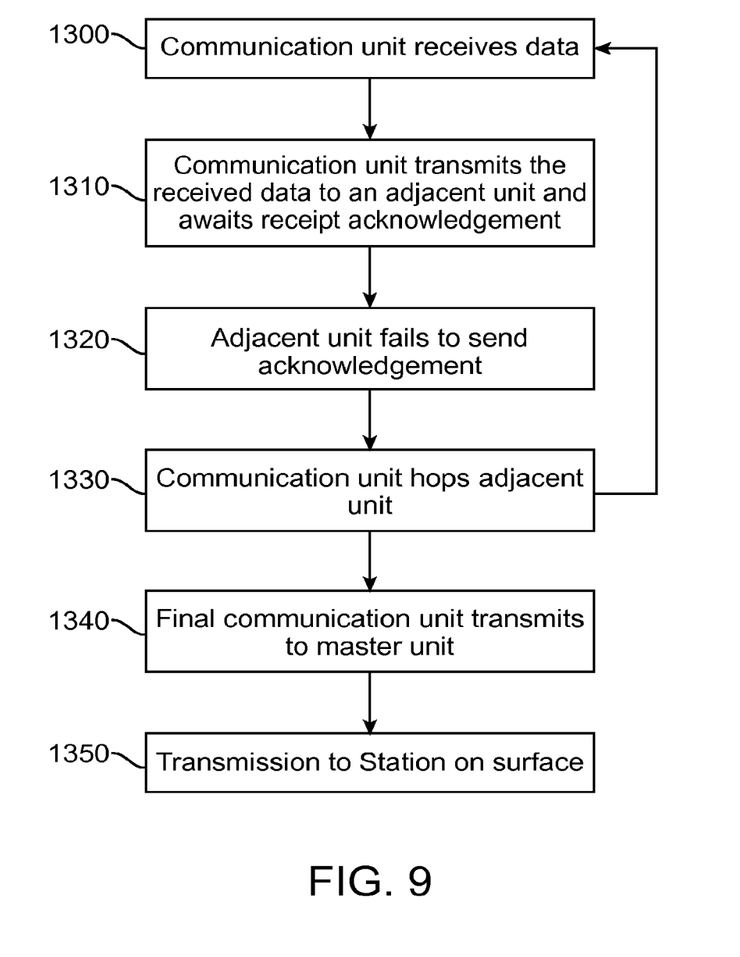
FIG. 9 is a flow diagram for relaying data in a wellbore.

Illustrative flow charts are provided in FIGS. 7-9 describing relaying data through the plurality of communication units within a wellbore. For example FIG. 7 illustrates a flow beginning at block 1000 wherein a communication unit receives data. This can be from MEMS sensors or received from another communication unit for example. In block 1010, the communication unit then transmits the received data to an adjacent communication unit. As shown by the arrow from block 1010 to block 1000, this process can be repeated across a plurality of communication units. Finally, as shown in block 1020, a final communication unit can transmit data to a master communication unit. The master communication unit can be within a wellbore but situated relative to the surface or entrance of the wellbore such that it can be communicatively coupled via wireline to a station outside the entrance of the wellbore as shown in block 1030.

As shown in FIG. 8, a communication unit first receives data at block 1100. This can be from MEMS sensors or received from another communication unit for example. In block 1110, the communication unit then transmits the data over one or more adjacent communication units to a receiving communication unit. As shown by the arrow from block 1110 to block 1100, this process can be repeated across a plurality of communication units. Finally, as shown in block 1120, a final communication unit can transmit data to a master communication unit. The master communication unit can be within a wellbore but situated relative to the surface or entrance of the wellbore such that it can be communicatively coupled via wireline to a station outside the entrance of the wellbore as shown in block 1130.

As shown in FIG. 9, a communication unit first receives data at block 1300. This can be from MEMS sensors or received from another communication unit for example. As shown in block 1310, the communication unit can then transmit the data to an adjacent communication unit and awaits receipt acknowledgement. For example the adjacent communication unit can either send a data received signal or other indication that it has received data. The first communication unit can wait a predetermined period of time or a random period of time, or pseudo random, where the time frame may vary slightly. If no receipt acknowledgement is received, then the first communication unit can hop over the adjacent unit and transmit data to the next adjacent unit as shown in 1330. As shown by the arrow from block 1330 to block 1300, this unit can then repeat this process of transmitting data and awaiting receipt, and hopping an adjacent unit (or more than one adjacent unit) if no receipt is acknowledged. The unit can also retain information, such as a pointer list, that the adjacent unit is inactive or non-responsive. This pointer list can be generated during relay from one unit to another or can be determined by a network of communication units prior to relay and updated during relay. Finally, as shown in block 1340, a final communication unit can transmit data to a master communication unit. The master communication unit can be within a wellbore but situated relative the surface or entrance of the wellbore such that it can be communicatively coupled via wireline to a station outside the entrance of the wellbore as shown in block 1350.

Numerous examples are provided herein to enhance understanding of the present disclosure. A specific set of examples are provided as follows.

In a first example, a repeater system provided in a wellbore is disclosed, the repeater system including: a plurality of communication units spaced at intervals along a length of a wellbore, the communication units being communicatively coupled via a transmission medium; the communication units being configured to relay data from one communication unit to another communication unit selected from the plurality of communication units along the transmission medium, wherein at least one of the communication units is hopped over as data is relayed across the plurality of communication units along the length of the wellbore.

In a second example, a system is disclosed according to the preceding example, wherein the plurality of communication units are spaced at intervals along a length of a casing positioned within the wellbore.

In a third example, a system is disclosed according to any of the preceding examples, further including a master station located within the wellbore and coupled to at least one of the plurality of communication units, the master station configured to transmit the relayed data to a receiving unit positioned outside an entrance hole of the wellbore.

In a fourth example, a system is disclosed according to the third example, further including a network formed from the plurality of communication units, the network relaying data from a first location in the wellbore to the master station, the master station configured to transmit to a station unit positioned outside an entrance hole of the wellbore.

In a fifth example, a system is disclosed according to any of the preceding examples, wherein the plurality of communication units include a memory device that stores a list identifying the plurality of communication units, wherein two or more communication units are hopped over as data is relayed across the plurality of communication units along the length of the wellbore.

In a sixth example, a system is disclosed according to the fifth example, wherein the two or more communication units are hopped over based on a static assignment stored in the list.

In a seventh example, a system is disclosed according to the fifth example, wherein the two or more communication units are hopped over based on a dynamic assignment stored in the list.

In an eighth example, a system is disclosed according to the seventh example, wherein the two or more communication units are hopped over based at least in part on a determination of inactive communication units.

In a ninth example, a system is disclosed according to any of the preceding examples, wherein the plurality of communication units are configured to receive a data packet that identifies the plurality of communication units, wherein one or more of the plurality of communication units is configured to hop over one or more predetermined communication units.

In a tenth example, a system is disclosed according to the ninth example, wherein the data packet identifies the one or more predetermined communication units to be hopped over based on a static assignment.

In an eleventh example, a system is disclosed according to the ninth example, wherein the data packet identifies the one or more predetermined communication units to be hopped over based on a dynamic assignment.

In a twelfth example, a system is disclosed according to the ninth example, wherein the dynamic assignment is based at least in part on a determination of inactive communication units.

In a thirteenth example, a system is disclosed according to any of the preceding examples, wherein the transmission medium is selected from at least one of a wireline or a casing disposed in the wellbore.

In a fourteenth example, a method is disclosed including providing a plurality of communication units spaced at intervals along a length of a wellbore, the communication units being communicatively coupled via a transmission medium; and relaying data from one communication unit to another communication unit selected from the plurality of communication units along the transmission medium, wherein at least one of the communication units is hopped over as data is relayed across the plurality of communication units along the length of the wellbore.

In a fifteenth example, a method is disclosed according to the fourteenth example, wherein the transmission medium is selected from at least one of a wireline or a casing disposed in the wellbore.

In a sixteenth example, a method is disclosed according to any of the preceding examples fourteenth to the fifteenth, wherein the plurality of communication units are spaced at intervals along a length of a casing positioned within the wellbore.

In a seventeenth example, a method is disclosed according to any of the preceding examples fourteenth to the sixteenth, further including a master station located within the wellbore and coupled to at least one of the plurality of communication units, the master station configured to receive and transmit the relayed data to a receiving unit positioned outside an entrance hole of the wellbore.

In an eighteenth example, a method is disclosed according to the seventeenth example, further including a network formed from the plurality of communication units, the network relaying data from a first location in the wellbore to the master station, the master station configured to transmit to a station unit positioned outside an entrance hole of the wellbore.

In a nineteenth example, a method is disclosed according to any of the preceding examples fourteenth to the eighteenth, wherein the plurality of communication units comprise a memory device that stores a list identifying the plurality of communication units, wherein two or more communication units are hopped over as data is relayed across the plurality of communication units along the length of the wellbore.

In a twentieth example, a method is disclosed according to the nineteenth example, wherein the two or more communication units are hopped over based on a static assignment stored in the list.

In a twenty first example, a method is disclosed according to the nineteenth example, wherein the two or more communication units are hopped over based on a dynamic assignment stored in the list.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A repeater system provided in a wellbore, the repeater system comprising:
    a plurality of communication units spaced at intervals along a casing fixedly cemented within a wellbore extending within a formation, the plurality of communication units each having a processor for processing received data and the communication units being communicatively coupled via a transmission medium, more than one of the plurality of communication units receiving data detected from sensors in the cement or coupled to a respective communication unit; and
    the plurality of communication units being configured to relay the detected data from one communication unit to another communication unit selected from the plurality of communication units along the transmission medium, and the plurality communication units being configured to hop over at least one of the communication units when a receipt acknowledgement is not received by a communication unit relaying the detected data from a communication unit receiving the detected data after a predetermined time frame as data is relayed across the plurality of communication units along a length of the wellbore,
    wherein the plurality of communication units comprise a memory device that stores a list identifying the plurality of communication units, and wherein the plurality of communication units are coupled with the casing or positioned behind the casing.

2. The repeater system of claim 1, further comprising a master station located within the wellbore and coupled to at least one of the plurality of communication units, the master station configured to transmit the relayed data to a receiving unit positioned outside an entrance hole of the wellbore.

3. The repeater system of claim 2, further comprising a network formed from the plurality of communication units, the network relaying data from a first location in the wellbore to the master station, the master station configured to transmit to a station unit positioned outside the entrance hole of the wellbore.

4. The repeater system of claim 1, wherein two or more communication units are hopped over based on a static assignment stored in the list.

5. The repeater system of claim 1, wherein two or more communication units are hopped over based on a dynamic assignment stored in the list.

6. The repeater system of claim 5, wherein the two or more communication units are hopped over based at least in part on a determination of inactive communication units.

7. The repeater system of claim 1, wherein the plurality of communication units are configured to receive a data packet that identifies the plurality of communication units, wherein one or more of the plurality of communication units is configured to hop over one or more predetermined communication units.

8. The repeater system of claim 7, wherein the data packet identifies the one or more predetermined communication units to be hopped over based on a static assignment.

9. The repeater system of claim 7, wherein the data packet identifies the one or more predetermined communication units to be hopped over based on a dynamic assignment.

10. The repeater system of claim 9, wherein the dynamic assignment is based at least in part on a determination of inactive communication units.

11. The repeater system of claim 1, wherein the transmission medium is selected from at least one of a wireline or a casing disposed in the wellbore.

12. The repeater system of claim 1, wherein an end of the casing is coupled with a larger casing, a master communication unit provided at a junction between the casing and the larger casing.

13. The repeater system of claim 1, wherein master communication unit processes data relayed from the plurality of communication units, the master communication configured to transmit the relayed data to a receiving unit positioned outside an entrance hole of the wellbore.

14. A method comprising:
providing a plurality of communication units spaced at intervals along a casing fixedly cemented within a wellbore extending within a formation, the plurality of communication units each having a processor for processing received data and the communication units being communicatively coupled via a transmission medium, more than one of the plurality of communication units receiving data detected from sensors in the cement or coupled to a respective communication unit; and relaying the data from one communication unit to another communication unit selected from the plurality of communication units along the transmission medium, the plurality communication units being configured to hop over at least one of the communication units when a receipt acknowledgement is not received by a communication unit relaying the detected data from a communication unit receiving the detected data after a predetermined time frame as data is relayed across the plurality of communication units along a length of the wellbore, wherein the plurality of communication units comprise a memory device that stores a list identifying the plurality of communication units, wherein the plurality of communication units are coupled with the casing or positioned behind the casing.

15. The method of claim 14, wherein the transmission medium is selected from at least one of a wireline or a casing disposed in the wellbore.

16. The method of claim 14, further comprising a master station located within the wellbore and coupled to at least one of the plurality of communication units, the master station configured to receive and transmit the relayed data to a receiving unit positioned outside an entrance hole of the wellbore.

17. The method of claim 16, further comprising a network formed from the plurality of communication units, the network relaying data from a first location in the wellbore to the master station, the master station configured to transmit to a station unit positioned outside the entrance hole of the wellbore.

18. The method of claim 14, wherein two or more communication units are hopped over based on a static assignment stored in the list.

19. The method of claim 14, wherein two or more communication units are hopped over based on a dynamic assignment stored in the list.

* * * * *